May 29, 1956  J. E. WILCOX ET AL  2,748,371
SIGNAL LIGHT
Filed July 6, 1953  4 Sheets-Sheet 1
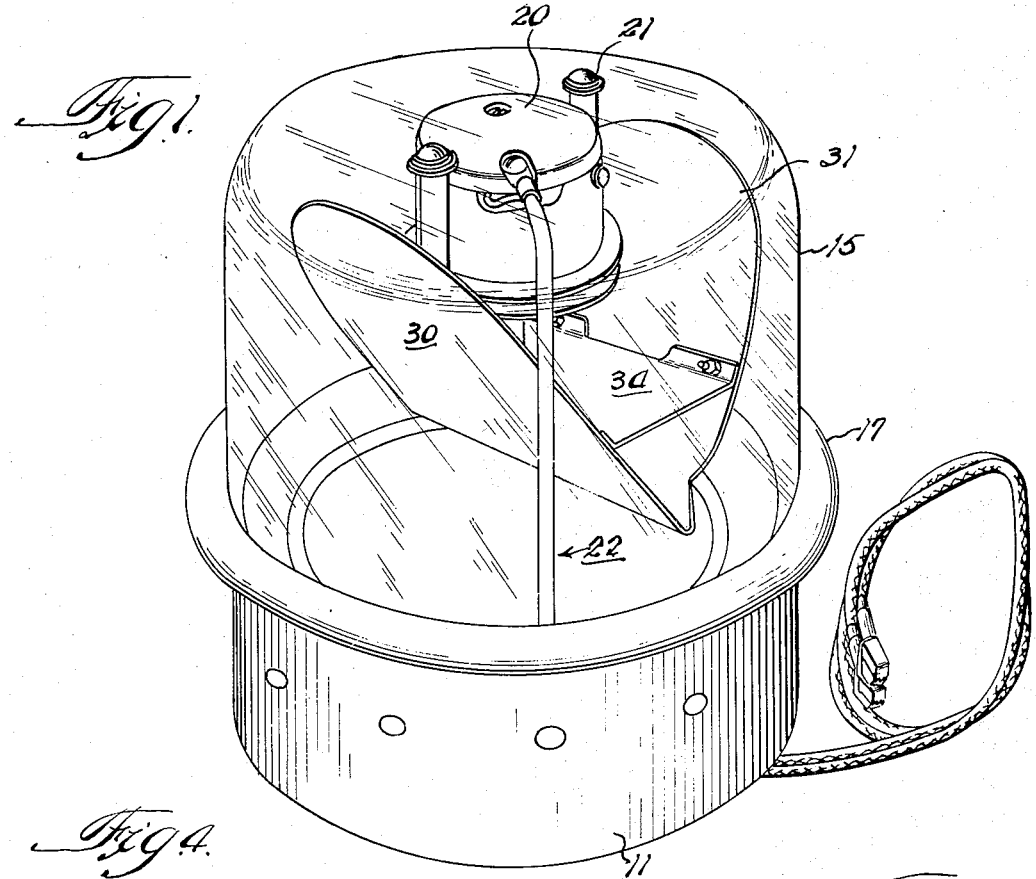
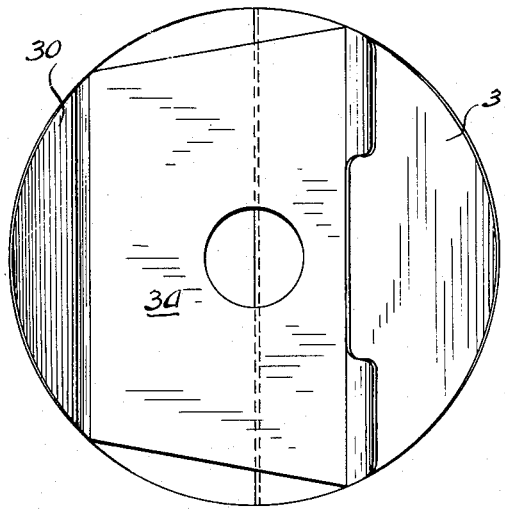
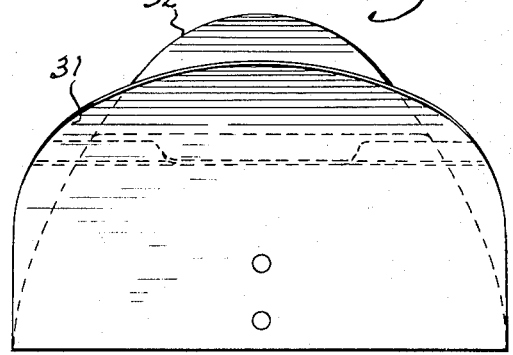
INVENTORS.
Joseph E. Wilcox,
Evan A. Jensen

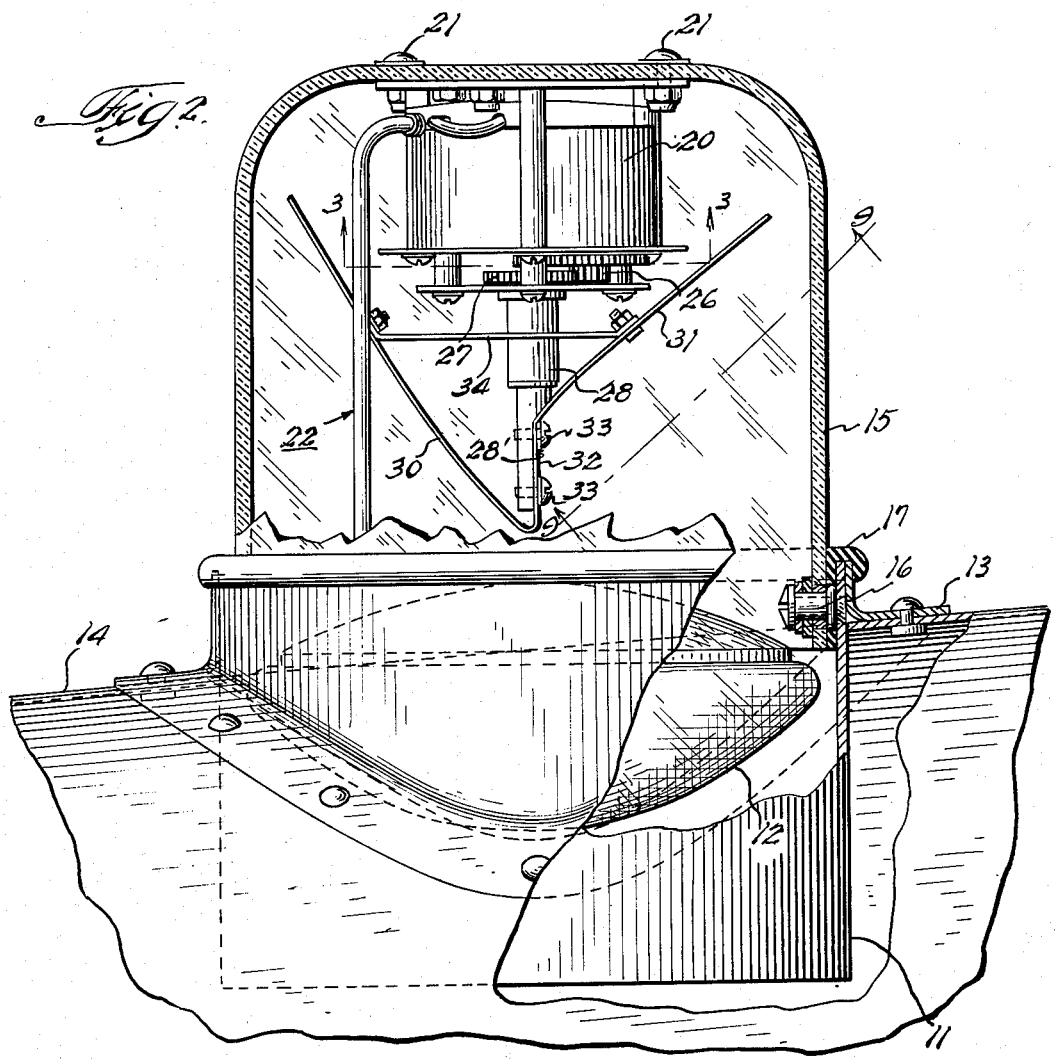
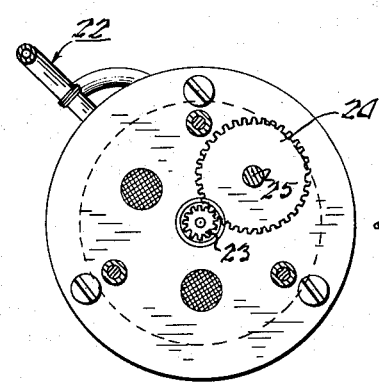

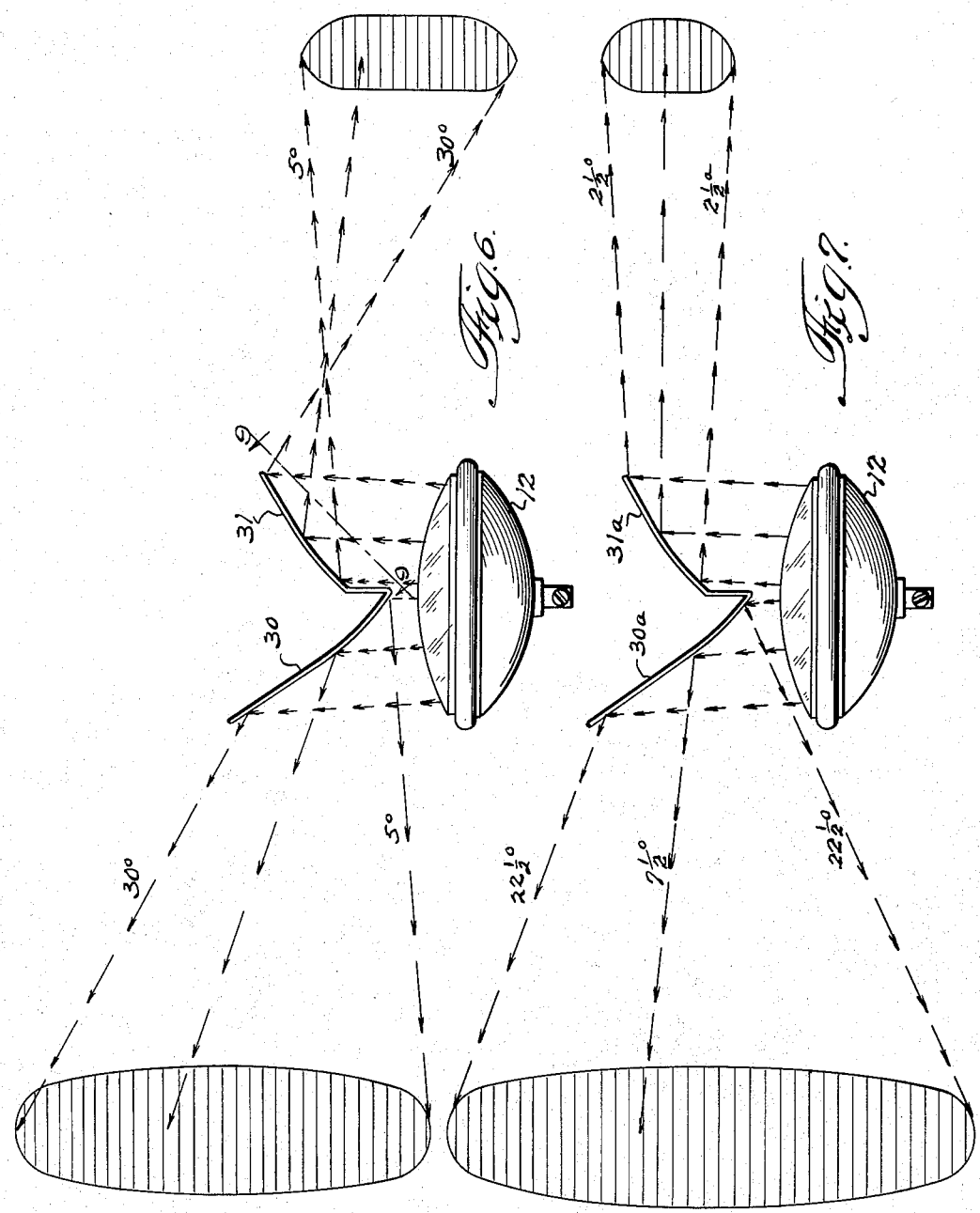

May 29, 1956     J. E. WILCOX ET AL     2,748,371
SIGNAL LIGHT
Filed July 6, 1953     4 Sheets-Sheet 4
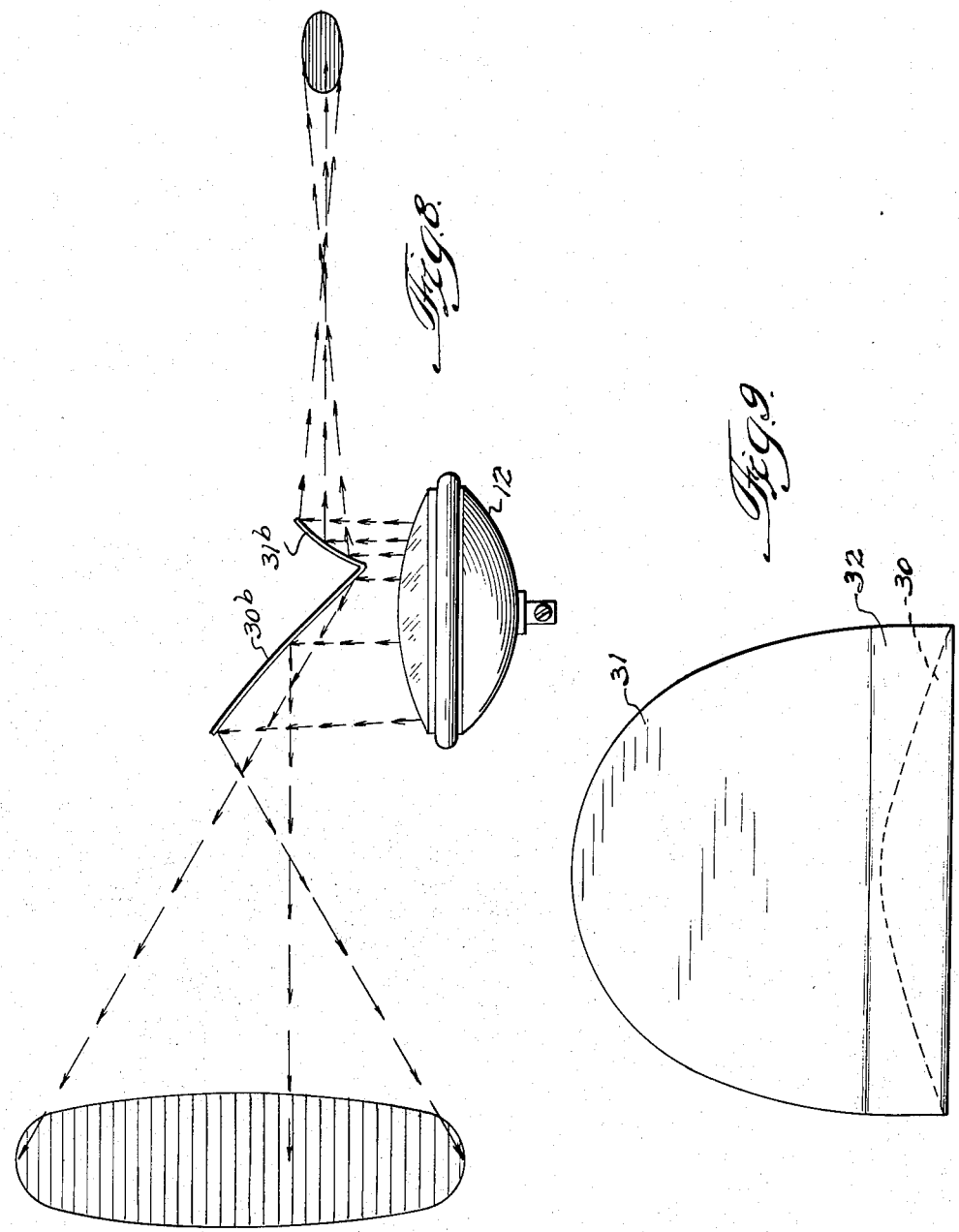

United States Patent Office 2,748,371
Patented May 29, 1956

2,748,371

SIGNAL LIGHT

Joseph E. Wilcox, Redwood City, and Evan A. Jensen, San Carlos, Calif., assignors to United Air Lines, Inc., Chicago, Ill., a corporation of Delaware Application July 6, 1953, Serial No. 366,190

5 Claims. (Cl. 340—25)

This invention relates to a signal light and it is an object of the invention to provide improved apparatus of such character.

In a signal or warning lights for various forms of vehicles, including automobiles, trains and airplanes, it is frequently desired that a projected beam of light rotate or otherwise move with respect to the vehicle. Such a moving beam of light is normally desired in order that an intense beam may be employed which cyclically covers a wide field. It is another object of the invention to provide a signal light for projecting a beam of light whose direction is constantly varied.

In the case of warning lights mounted on airplanes and on police cars and in various other applications, it is commonly required that a beam of light be propagated whose axis sweeps through 360 degrees in a flat plane. It is another object of the invention to provide a warning light of such character. When such warning lights are mounted on an airplane, it is necessary of course that certain portions of the structure protrude from the outer surface of the airplane. It is still another object of the invention to provide an improved warning light of the character described which requires a minimum protrusion outwardly of the surface of the construction on which it is mounted.

It is another object of the invention to provide improved apparatus for producing a rotating or oscillating beam of light, which apparatus is readily adapted to the propagation of one, two or more beams of light, either or both of which may be made to rotate or oscillate to trace flat, or conical or other curved surfaces.

It is another object of the invention to provide an improved signal light having the characteristics described above while being simple, reliable and economical to manufacture.

This invention, together with further objects and advantages thereof, will best be understood by reference to the following description taken in connection with the accompanying drawings, and its scope will be pointed out in the appended claims.

In the drawings, in which like parts are designated by like references numerals, Fig. 1 is a perspective view of a signal light illustrating one embodiment of the invention;

Fig. 2 is an elevational view partially broken away of the same signal light;

Fig. 3 is a cross-sectional view taken along the line 3—3 of Fig. 2;

Fig. 4 is a plan view of certain reflectors employed in the signal light in Figs. 1, 2 and 3;

Fig. 5 is a side-elevational view of the reflectors shown in Fig. 4;

Fig. 6 is an optical diagram illustrating the formation of the light beams produced by the signal light illustrated in Figs. 1–5;

Fig. 7 is a similar diagram illustrating the formation of light beams projected by the signal light of Figs. 1–5 but with modified reflectors;

Fig. 8 is still another optical diagram illustrating a light beam pattern obtainable by further modification of the reflectors employed in the signal light disclosed in Figs. 1–6; and Fig. 9 is a cross-sectional view taken along the line 9—9 of Fig. 2.

In the various embodiments of the invention illustrated in the drawings, one or more beams of light are caused to rotate through 360 degrees in a substantially flat plane in a manner similar to a lighthouse beam. It is to be understood, however, that the invention is not limited to such an application but may be employed to produce one or more beams whose axis is caused to trace conical surfaces, having an acute or obtuse apex angle, or to trace other partial or complete surfaces of regular or irregular configuration.

The signal light disclosed in Figs. 1–6 includes a base 11, best seen in Fig. 2, which houses a light source 12. The light source may be in the form of a sealed beam lamp, as illustrated, and projects a light beam in an upwardly direction. The light source 12 preferably includes a reflector which forms a beam of substantially parallel rays in order that the available light may be more efficiently utilized.

Apparatus for mounting the light source 12 in the base 11 and for energizing the light source, and means for cooling the light source, if desired, may be of any suitable form and do not constitute features of the present invention. Accordingly, such apparatus is not disclosed in the drawings. It is believed to be sufficient for the purpose of describing the present invention to state that the light source 12 is substantially fixed with respect to the base 11 and produces an upwardly directed beam composed preferably of parallel rays.

A suitable flange 13 is preferably provided on the base 11 in order that the signal light may readily be secured to a selected structure, such as the upper surface of an airplane wing or stabilizer, designated 14 in Fig. 2.

A transparent dome 15, formed of plastic or glass, for example, is secured to the base 11 and a seal is formed therebetween by any suitable construction such as the fasteners 16 and the gasket 17 illustrated in Fig. 2. It will be appreciated by reference to Fig. 2 that the major portion of the base 11 is set into the structure upon which the signal light is mounted, while a small portion of the base 11 and the major portion of the dome 15 protrude outwardly of the surface of such structure.

An electric motor 20 is secured to the upper portion of the dome 15 as by screws 21. Electric power is transmitted to this electric motor through any suitable means such as the conductors generally designated 22 in Figs. 1 and 2. In the illustrated embodiment of the invention these conductors comprise a hollow metallic tube and an insulated conductor contained within said tube. This construction does not form a feature of the invention and is not shown in detail in the drawings. The shaft of the motor 20 terminates in a spur gear 23 best seen in Fig. 3, which gear drivingly engages another gear 24 which is secured to a freely rotatable shaft 25. Also secured to the shaft 25 is a gear 26 seen in Fig. 2, which engages a fourth gear 27 which is preferably but not necessarily concentric with the motor shaft and the gear 23. It will be readily understood that the gears 23, 24, 26 and 27 serve to reduce the speed of the output gear 27 with respect to the motor shaft by a substantial ratio.

A shaft 28 is secured to and driven by the gear 27 and carries a reflector assembly. The reflector assembly includes a pair of reflectors 30 and 31 which are preferably formed integral with each other. In the particular embodiment illustrated in Figs. 1–6 the reflector assembly includes a vertical portion 32 intermediate the two reflectors 30 and 31, this vertical portion being secured to a flattened portion 28' of the shaft 28 by any suitable means such as the screws or rivets 33. A brace or strut 34 may also be connected between the reflectors 30 and 31, as shown, to make the reflector assembly strong and rigid.

Where the signal light is used as a navigation light for an airplane, as illustrated in the drawings, a desirable speed of rotation for the reflector assembly is 60 R. P. M. Accordingly, it will readily be seen that the motor 20 should have a relatively low speed and that the reduction gear assembly 23—27 should have a substantial ratio of input to output speed.

In the illustrated embodiment a circular beam of light is projected upwardly by the light source. The two reflectors, in combination, have a circular outline in plan view as may be seen best in Fig. 4. The horizontal dimensions of the two reflectors are such that they may intercept the beam of light emitted by the light source 12 while still fitting freely within the dome 15.

As may be seen in Fig. 6 the two reflectors 30 and 31 serve to reflect the parallel rays of the light source 12 to form two beams extending in substantially horizontal directions, that is, substantially perpendicular to the direction of the rays as emanating from the light source. More specifically, the reflector 30 directs a beam toward the left in Fig. 6 while the reflector 31 reflects a beam toward the right.

In order to provide broad visibility of the light beam reflected from the reflector 30, the reflector is curved as illustrated such that the light rays striking various portions of the reflector 30 are directed in vertically divergent directions. In the particular embodiment of the invention illustrated in Figs. 1–6, the rays of light striking the upper or radially outward portion of the reflector 30 are reflected at an angle 30 degrees upwardly of the horizontal, while the light rays striking the lower or radially inward portion of the reflector 30 are reflected at an angle 5 degrees below the horizontal.

The reflector 31 is, in the illustrated embodiment of the invention, concave downwardly, whereby the slope of the reflector is greater at its lower or radially inward portion than at its upper or radially outward portion. In this embodiment the light rays striking the latter portion of the reflector are reflected 30 degrees below the horizontal while the light rays striking the radially inward portion are reflected at an angle 5 degrees above the horizontal.

With this particular arrangement it may be seen that one beam, namely, that projected to the left in Fig. 6, is visible to an observer whose altitude is such that he lies within an angle between +30 degrees and −5 degrees. Similarly the right-hand beam is visible to an observer lying within +5 degrees and −30 degrees. Accordingly, an observer whose altitude is such that he lies within ±5 degrees will see two flashes of light for each revolution of the reflector assembly, and an observer whose altitude is such that he lies between +30 and +5 degrees or −30 degrees and −5 degrees will see one flash of light for each revolution of the reflector assembly. With a standard speed of rotation established, it will be apparent that an observer may readily determine, upon sighting a signal, whether he lies between ±5 degrees of the source of the signal or between +30 degrees and +5 degrees or −30 degrees and −5 degrees. This information is, of course, valuable in air flight as is well recognized in the art.

In the preferred embodiment of the invention the reflectors 30 and 31 are curved in only one plane whereby the lateral or horizontal divergence of the respective beams reflected therefrom is a function of the divergence of the beams as emanating from the light source 12. Tests conducted with one form of sealed beam light source 12 showed a lateral divergence of approximately 5 degrees. This spread is found to be sufficient that the beam is readily detectable with the reflector assembly rotating at 1 R. P. M. In other words, the 5 degree lateral divergence of the beam is a satisfactory compromise between intensity of beam and duration of visibility at any given point remote from the signal light. In the event that greater lateral divergence is required a light source having greater dispersion may be employed or the reflectors 30 and 31 may be bowed in a direction perpendicular to the light rays emanating from the light source. However, these expedients will, of course, result in a less intense beam.

It will be noted, particularly by reference to Fig. 4, that the portions of either reflector lying near the center line of the light source will reflect a substantially larger share of the light beam emanating from the light source 12 than the portions lying above the radially outer part of the light source. In order to compensate for this, it is preferable that the reflector 30, which is convex downwardly, be more sharply curved at the lower or radially inward portions than at the upper or radially outward portions. With this arrangement the light rays striking the radially inward portions are more widely dispersed vertically than are the rays striking the radially outward portions. It will be apparent that by such means the intensity of the light beam as reflected from the reflector 30 may be made of substantially uniform intensity over its vertical range.

This characteristic of the reflector 30 is indicated by the fact that the illustrated light ray striking the center of the reflector 30 is reflected upwardly along a line more nearly parallel to a +30 degree limit than to the −5 degree limit. More specifically, the illustrated light ray striking the center of the reflector 30 is directed to the left at an angle of approximately +15 degrees. Accordingly, the portion of the light beam striking the left-hand portion of the reflector 30 is dispersed over approximately 15 degrees while the portion of the total light beam striking the right-hand portion of the reflector 30 is dispersed over approximately 20 degrees. Since substantially more light strikes the right-hand portion of the reflector 30 than the left-hand portion thereof, this arrangement results in a substantially uniform intensity of the light beam as reflected from the reflector 30.

A similar arrangement is, of course, employed in the reflector 31. Specifically the radially inward portion of the reflector 31 is more sharply curved than the radially outward portion whereby the illustrated light ray striking the center of the reflector 31 is reflected at an angle of approximately −10 degrees.

A modified arrangement of reflectors is disclosed in Fig. 7 wherein a reflector 30a is so curved as to reflect a beam which is spread over an angle between +22½ degrees and −22½ degrees, or over a total angle of 45 degrees, vertically. A second reflector 31a reflects a beam to the right in Fig. 7 which is spread over a 5 degree angle centered about the horizontal.

This modification is similar to that shown in Fig. 6 in that the signal lamp is visible twice during each revolution thereof to an observer at such an altitude that he lies within a certain small angle of a horizontal plane passing through the signal light (in this instance ±2½ degrees). Also the signal light is visible once during each revolution of the reflector assembly to an observer lying outside the range of the right-hand beam but within the range of the left-hand beam.

In addition to the somewhat modified angles of coverage of the beams, it will be apparent that the right-hand beam will be much more intense than the left-hand beam since each reflector reflects the same amount of light and the right-hand reflector concentrates this quantity of light within a much smaller total angle of dispersion. Accordingly, an observer lying between ±2½ degrees of a horizontal plane passing through the signal light will see alternately an intense beam (the right-hand beam) and a relatively weak beam (the left-hand beam).

The right-hand beam in Fig. 7 will be observable at a much greater distance than the left-hand beam or either of the beams projected by the embodiment illustrated in Fig. 6. This may be desirable in certain instances, since an observer lying within this smaller angle is in greater danger of collision with the aircraft carrying the signal light than one which is above or below the smaller right-hand beam but within the angle of the left-hand beam. It would be desirable, in other words, that two planes flying at substantially the same altitude (within ±2½ degrees) may be made aware of each other's presence at a maximum distance, even at the expense of receiving warning at a relatively shorter distance when the planes are flying at levels within ±22½ degrees but outside of the more dangerous angle of ±2½ degrees.

Still another embodiment of the invention is disclosed in Fig. 8 in which a reflector 30b reflects a beam which is dispersed vertically over an angle of 45 degrees centered about a horizontal plane, and a reflector 31b reflects a beam which is dispersed vertically over an angle of 5 degrees centered about a horizontal plane. To this extent this third modification is the same as that disclosed in Fig. 7. However, in Fig. 8 the reflector 30b is so proportioned as to intercept approximately nine-tenths of the light projected from the light source while the reflector 31b reflects the remaining one-tenth. Since the reflector 30b disperses a beam over an area nine times as great as the area of the beam reflected by the reflector 31b it will be apparent that the two beams will be of equal intensity.

An observer will see two flashes of light during each revolution of the signal light if he lies within the ±2½ degree angle of the right-hand beam, and he will see one flash for each revolution of the signal light if he lies outside of this small angle but within the ±22½ degree angle of the left-hand beam. This arrangement is similar to that illustrated in Fig. 6 in that both beams are visible at substantially the same distance. The reflector assembly illustrated in Fig. 8 is, of course, intended to be rotated about an axis concentric with the light beam projected from the light source.

In the various illustrated embodiments of the invention, it is seen that the light source, and the focusing reflector which is preferably employed therewith, may both be stationary or fixed in position relative to the structure on which the signal light is mounted. The reflectors which cause motion of the light beam or beams ultimately emanating from the signal light need not be focusing reflectors but may be simple, flat mirrors, although, as in the illustrated embodiments, they may be curved to disperse rather than focus the light beam or beams as reflected therefrom.

The basic arrangement employed in the various illustrated embodiments of the invention permits the use of a focusing reflector which is in fixed position relative to the filament or other ultimate light source, whereby the reflector may be maintained in ideal focusing position. Furthermore, the rotating or otherwise moving parts may be relatively light and may be so oriented with respect to the light beam emanating from the light source as to reflect light beams in any desired direction. The reflectors may, for example, be oriented as in Fig. 6 to direct beams to either side of a plane extending perpendicular to the light beam projected by the light source. The reflector 30 in Fig. 6 may readily be arranged at a much steeper angle whereby a light beam may be reflected therefrom at an angle nearly parallel to the original light beam projected by the light source 12. As the reflector 30 rotates the light beam reflected therefrom would, of course, define a cone having a very acute apex angle. In such an application it may be preferable that the motor or other driving means be located at one side of the light beams, with any suitable power transmitting means connecting the driving means and the reflector assembly.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A signal light comprising a light source for emitting a circular beam of substantially parallel rays, a reflector arranged in said beam, and means for moving said reflector through a fixed cycle of movement whereby the beam of right reflected therefrom may trace a fixed pattern in space, said reflector being tilted about a diameter of said circular beam with respect to a plane perpendicular to said beam, said reflector being curved in a direction to produce a given angle of dispersion of the beam of light reflected therefrom as measured in a plane containing the axis of said circular beam and perpendicular to said diameter, such curvature of said reflector being of smaller radius in the portions thereof adjacent said diameter than in the portions thereof remote from said diameter.

2. A signal light comprising a source of light emitting a beam of substantially parallel rays, a pair of reflectors arranged within said beam, and means for rotating said reflectors about an axis parallel to said beam and substantially centered therein, said reflectors being so oriented that the axes of the beams reflected therefrom extend at substantially differing angles with respect to a plane which is perpendicular to said axis of rotation, said reflectors being curved in at least one direction to produce given angles of dispersion of the beams of light reflected thereby as measured in a plane containing said axis of rotation and the axis of the corresponding reflected beam, and such that said reflected beams trace overlapping paths.

3. A signal light comprising a source of light emitting a beam of substantially parallel rays, a pair of reflectors arranged within said beam, and means for rotating said reflectors about an axis parallel to said beam and substantially centered therein, said reflectors being differently curved in at least one direction to produce substantially differing given angles of dispersion of the beams of light reflected thereby as measured in a plane containing said axis of rotation and the axis of the corresponding reflected beam, said reflectors being so oriented that the axes of said reflected beams are disposed at substantially the same angle with respect to the axis of rotation of said reflectors.

4. A signal light comprising a source of light emitting a beam of substantially parallel rays, a pair of reflectors arranged within said beam, and means for rotating said reflectors about an axis parallel to said beam and substantially centered therein, said reflectors being differently curved in at least one direction to produce substantially differing given angles of dispersion of the beams of light reflected thereby as measured in a plane containing said axis of rotation and the axis of the corresponding reflected beam, the reflector having the wider angle of dispersion being of such proportions as to reflect a greater portion of the beam of light from said source than the other of said reflectors, whereby the intensity of the two reflected beams may be of substantially equal intensity.

5. A signal light comprising a source of light emitting a beam of substantially parallel rays, a pair of reflectors arranged within said beam, and means for rotating said reflectors about an axis parallel to said beam and substantially centered therein, said reflectors being differently curved in at least one direction to produce substantially differing given angles of dispersion of the beams of light reflected thereby as measured in a plane containing said axis of rotation and the axis of the corresponding reflected beam, said reflectors being so oriented that the axes of said reflected beams are disposed at substantially the same angle with respect to the axis of rotation of said reflectors, the reflector having the wider angle of dispersion being of such proportions as to reflect a greater portion of the beam of light from said source than the other of said reflectors, whereby the intensity of the two reflected beams may be of substantially equal intensity.

References Cited in the file of this patent

UNITED STATES PATENTS

| | | |
|---|---|---|
| 1,417,457 | Cook | May 23, 1922 |
| 1,670,682 | Halverson | May 22, 1928 |
| 2,607,838 | McDowell | Aug. 19, 1952 |

FOREIGN PATENTS

| | | |
|---|---|---|
| 28,297 of 1912 | Great Britain | Aug. 14, 1913 |
| 447,410 | France | Oct. 28, 1912 |